United States Patent [19]

Whitlock

[11] 4,124,653

[45] Nov. 7, 1978

[54] ELASTOMER BLEND

[75] Inventor: Kenneth H. Whitlock, Hemel Hempstead, England

[73] Assignee: E. I. Du Pont de Nemours and Company, Wilmington, Del.

[21] Appl. No.: 859,970

[22] Filed: Dec. 12, 1977

[30] Foreign Application Priority Data

Dec. 14, 1976 [GB] United Kingdom ........ 52161/76

[51] Int. Cl.$^2$ ............................................. C08L 67/06

[52] U.S. Cl. ................................. 260/873; 260/75 R; 260/860

[58] Field of Search .......................................... 260/873

[56] References Cited

U.S. PATENT DOCUMENTS

| | | | |
|---|---|---|---|
| 2,927,093 | 3/1960 | Germon | 260/873 |
| 3,419,511 | 12/1968 | Condo | 260/873 |
| 3,651,014 | 3/1972 | Witsiepe | 260/75 R |
| 3,763,019 | 10/1973 | Witsiepe | 260/75 R |
| 3,766,146 | 10/1973 | Witsiepe | 260/75 R |

FOREIGN PATENT DOCUMENTS

| | | | |
|---|---|---|---|
| 2,438,289 | 2/1975 | Fed. Rep. of Germany | 260/873 |
| 46-5,227 | 2/1972 | Japan | 260/873 |
| 47-5,104 | 2/1972 | Japan | 260/873 |
| 1,408,987 | 10/1975 | United Kingdom | 260/873 |

*Primary Examiner*—Paul Lieberman

[57] ABSTRACT

An elastomeric blend of (A) a butadiene/acrylonitrile copolymer and (B) a copolyetherester consisting essentially of 15–95% by weight of short chain ester units derived from a dicarboxylic acid and having a molecular weight not greater than 300 and a diol having a molecular weight not greater than 250, and 5–85% by weight of long chain ester units derived from a dicarboxylic acid having a molecular weight not greater than 300 and a poly(alkylene oxide)glycol having a number average molecular weight of 400–6000, said copolyetherester having a melting point of at least 100° C; the blend containing from 1–50% by weight of component (A).

8 Claims, No Drawings

ELASTOMER BLEND

BACKGROUND OF THE INVENTION

This invention relates to blends of copolyetherester elastomers with nitrile copolymers, i.e., butadiene/acrylonitrile copolymers.

It is known to prepare thermoplastic elastomeric copolyetheresters, which are substantial linear, by reacting together a mixture of a dicarboxylic acid (or its ester), a long chain polymeric glycol, and a low molecular weight diol in suitable proportions. The product is a segmented block copolyetherester composed both of long chain ester units, which are those segments of the polymer chain derived from the esterification of the long chain glycol with the dicarboxylic acid, and short chain ester units derived from the esterification of the low molecular weight diol with the dicarboxylic acid. In a specific embodiment copolyetherester elastomers are prepared by copolymerization of dimethyl terephthalate (DMT), butanediol, and poly(tetramethylene ether)glycol (PTMEG). The polyester units of DMT and butanediol form a high-melting hard segment in the block copolyetherester, while the long chain ester units provide high elongation to the segmented copolyetherester. Representative copolyetheresters and their methods of preparation are disclosed in U.S. Pat. Nos. 3,651,014, 3,766,146, and 3,763,109.

These copolyetheresters are prepared by known procedures and provide elastomers having good tensile strength, tear strength and abrasion resistance, but they have not been found particularly suitable for application in blow-molding techniques due to instability of the parison, i.e., the extrudate suspended in the mold prior to blow-molding. Accordingly there has existed a need to improve the stability of these copolyetheresters on the parison without in any way detracting from the strength of the final blow-molded product.

SUMMARY OF THE INVENTION

It has now been discovered that blends of copolyetherester with a butadiene/acrylonitrile copolymer (nitrile rubber) show increased parison stability and provide, on blow-molding, products which do not exhibit the disadvantages encountered when blow-molding copolyetherester alone. Moreover, the addition of the butadiene/acrylonitrile copolymer provides a convenient means for lowering the hardness of copolyetheresters without significantly reducing other physical properties. Processability in injection molding or extrusion operations is usually improved by the addition. Surprisingly, the presence of the butadiene/acrylonitrile copolymer in even minor amounts markedly increases the useful life of copolyetheresters in heat aging.

More specifically, the invention relates to an elastomeric blend of (A) a butadiene/acrylonitrile copolymer and (B) a copolyetherester consisting essentially of 15-95% by weight of short chain ester units derived from a dicarboxylic acid having a molecular weight not greater than 300 and a diol having a molecular weight not greater than 250, and 5-85% by weight of long chain ester units derived from dicarboxylic acid having a molecular weight not greater than 300, and a poly(alkylene oxide)glycol having a number average molecular weight of 400-6000, said copolyetherester having a melting point of at least 100° C.; the blend containing from 1-50% by weight, preferably 15-35% by weight of component (A).

It is preferred that the copolymer (A) of acrylonitrile and butadiene has a Mooney Viscosity of from 30 to 120 (ML -4, 100° C.) and a acrylonitrile content of from 18-50%, and that copolyetherester (B) has a molecular weight such that the inherent viscosity (0.1 gm/dl in m-cresol at 30° C.) is between 0.75 and 1.7. Preferably, the melt tension value of the blend of acrylonitrile/butadiene copolymer and copolyetherester elastomer is at least 0.4 gm. Generally, as the proportion of acrylonitrile/butadiene copolymer rubber is increased in the blend, the melt tension value increases. Usually, the proportion of butadiene/acrylonitrile used in the blend is from about 15-35% weight.

In an embodiment of the invention, and when softer blends are required, an amount of polyvinyl chloride may be present uniformly distributed throughout the blend. The polyvinyl chloride, when present, will desirably constitute up to 20% by weight of the blend. Polyvinyl chloride suitable for use in this way is readily available commercially in solid or powder form, and blends or polyvinyl chloride and butadiene/acrylonitrile copolymer are also readily available, e.g., under the trade name "Krynac" 850 (Polymer Corp., Sarnia, Ontario, Canada) and Butakon AC 6040 (British Vita Ltd.).

DETAILED DESCRIPTION

The butadiene/acrylonitrile copolymer which constitutes component (A) of the blend will generally be one of those which is widely available commercially. Copolymers of this type are well-known in the art and are described in, for example, U.S. Pat. No. 1,973,000 and in Encyclopedia of Polymer Science and Technology, Volume 2, pp. 703-706 (1965).

The addition of the butadiene/acrylonitrile copolymer and, optionally, the polyvinyl chloride, to the copolyetherester has been found to give significant advantages. Parison stability has been increased and the tendency shown by copolyetherester alone in blow-molding techniques to provide hollow articles having patchy hard and soft areas has been greatly reduced. Thus, articles may be produced for a variety of applications, e.g., bottles, steering bellows or other durable hollow articles, and such articles blow-molded from a blend of the composition described herein.

The segmented copolyetherester component (B) is desirably produced by reacting together in a mixture at least one long chain glycol, at least one low molecular weight diol or a derivative thereof and at least one dicarboxylic acid or a derivative thereof. The long chain glycol and the dicarboxylic acid or their derivatives react to form segments of the copolyetherester chain which are designated as long chain ester units. The short chain ester units are segments of the copolyetherester chain which are the reaction product of the low molecular weight diol and the dicarboxylic acid. The reaction is conducted by conventional methods and conditions. The short chain ester units will desirably be chosen so that a polymer made up solely of short chain ester units and having a molecular weight in the fiber-forming range (>5000), has a melting point of at least 150° C. The melting point is determined by differential scanning calorimetry using the procedure described hereinafter.

Generally, the long chain and the short chain units combine to form the copolyetherester polymer according to their tendencies to react under the conditions used. This order of combination can be termed random or statistical. The various ester units are combined in a head-to-tail arrangement through ester linkages forming a substantially intralinear polymer. The exact polymer chain configuration is not critical as long as the various reactant and proportion parameters are met.

Copolyetherester polymers useful in this invention have 5–85 weight percent long chain ester units, often from 15–75 weight percent and may have at least 50 mole percent of the total short chain ester units of the same type, i.e., derived from one type of acid and one type of low molecular weight diol. Preferred copolyetherester polymers also have an inherent viscosity of from 0.75 to 1.7 determined by the method described hereinafter.

Copolyetherester polymers useful in this invention can be conveniently made by conventional ester interchange reaction. A preferred procedure involves heating at about 150°–260° C. the dimethyl ester of a dicarboxylic acid with a long chain glycol and a molar excess of a short chain diol in the presence of an ester interchange catalyst. Methanol formed by the interchange reaction is distilled off and heating is continued until methanol evolution is completed. The interchange reaction or polymerization is typically complete within a few minutes to a few hours depending upon the particular temperature, catalyst, glycol excess, and reactants used. This procedure produces a low molecular weight prepolymer which can be transformed into high molecular weight copolyetherester by additional ester interchange as described herein.

Low molecular weight ester prepolymer can be prepared by other ester interchange procedures. A long chain glycol can be reacted with a high or low molecular weight short chain ester homopolymer or copolymer in the presence of ester interchange catalyst until a random ester prepolymer is produced by the interchange reacton. Short chain ester homopolymer or copolymer can be prepared by ester interchange from either dimethyl esters and low molecular weight diols, as above, or from free acids with diol acetates. Short chain ester copolymer can be prepared by direct esterification of appropriate acids, anhydrides, or acid chlorides with diols, or alternatively, by reaction of the acids with cyclic ethers or carbonates. Ester prepolymer can also be prepared by using a long chain glycol in place of a diol or using a mixture of reactants.

Molecular weight of the ester prepolymer is increased by removing excess short chain diol by distilling it from the prepolymer. This operation is frequently referred to as "polycondensation." Additional ester interchange occurs during the distillation to increase the molecular weight and to further randomize the arrangements of the copolyetherester units. The distillation conditions typically are less than 1 mm Hg, at 220°–280° C. Antioxidants, such as sym-di-beta-naphthyl-p-phenylene-diamine and 1,3,5-trimethyl-2,4,6-tris(3,5-ditertiary-butyl-4 hydroxybenzyl)-benzene can be added to reduce degradation.

To increase the rate of ester interchange catalysts can be employed for the prepolymer and polycondensation steps. Any one of a wide variety of well known catalysts can be used, but organic titanates, such as tetrabutyl titanate either alone or combined with magnesium or zinc acetates, are preferred. Complex titanates derived from alkali or alkaline earth metal alkoxides and titanate esters are very effective. Inorganic titanates (such as lanthanum titanate), calcium acetate/antimony trioxide mixtures, and lithium and magnesium alkoxides are other catalysts which can be used.

Ester interchange polymerizations are generally run in a melt without added solvent, but inert solvent can be used to facilitate removal of volatile components from the mass at low temperatures. Both batch and continuous methods can be used for any stage of copolyetherester polymer preparation. Polycondensation of prepolymer can also be accomplished in the solid phase by heating finely divided solid prepolymer in a vacuum or in a stream of inert gas to remove liberated low molecular weight diol.

Long chain glycols which can be used to produce the copolyetherester polymers are substantially linear glycols having hydroxy groups on the chain which are terminal, or as nearly terminal as possible, and having a molecular weight of above about 400 and preferably 400–6000.

Long chain glycols which can be used to prepare copolyetherester polymers useful in this invention include poly(alkylene oxide)glycols wherein the alkylene group has 2–9 carbon atoms, such as poly(ethylene oxide)glycol, poly(1,2,- and 1,3-propylene oxide)gylcol, poly(tetramethylene oxide)glycol, poly(pentamethylene oxide)glycol, poly(hexamethylene oxide)glycol, poly(heptamethylene oxide)glycol, poly(octamethylene oxide)glycol, poly(nonamethylene oxide)glycol, poly(1,2,-butylene oxide)glycol; random or block copolymers of ethylene oxide and 1,2-propylene oxide, and poly-formals prepared by reacting formaldehyde with glycols, such as pentamethylene glycol, or mixtures of glycols, such as a mixture of tetramethylene and pentamethylene glycols.

Poly(alkylene oxide)glycols including poly(tetramethylene oxide)glycol, poly(ethylene oxide)glycol, poly(1,2-propylene oxide)glycol, and poly(1,2,-propylene oxide)glycol capped with ethylene oxide units are preferred long chain glycols.

Dicarboxylic acids which can be used to produce useful copolyetherester polymers are aliphatic, cycloaliphatic, or aromatic dicarboxylic acids of a low molecular weight, i.e., having a molecular weight of less than about 300. Dicarboxylic acids, as used herein, include acid equivalents having two functional carboxyl groups which perform substantially like dicarboxylic acids in reaction with glycols and diols forming copolyetherester polymers. These equivalents include esters, ester-forming derivatives, such as acid halides and anhydrides, and other derivatives which behave substantially like dicarboxylic acids forming esters with glycols and diols. The molecular weight requirement pertains to the acid and not to its equivalent, ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyetherester polymer formation and use of the polymer in the process of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used for this invention are sebacic acid, 1,3,-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, 4-cyclohexene-1,2,-dicarboxylic acid, 2-ethylsuberic acid, 2,2,3,3-tetramethylsuccinic acid, cyclopentanedicarboxylic acid, decahydro-1,5-naphthylene dicarboxylic acid, 4,4'-bicyclohexyl dicarboxylic acid, decahydro2,6-naphthylene dicarboxylic acid, 4,4'-methylene-bis(cyclohexyl) carboxylic acid, 3,4,-furan dicarboxylic acid, and 1,1-cyclobutane dicarboxylic acid. Preferred aliphatic acids are cyclohexanedicarboxylic acids and adipic acid.

Representative aromatic dicarboxylic acids which can be used include orthophthalic, terephthalic, and isophthalic acids, bibenzoic acid, substituted dicarboxy compounds with two benzene nuclei such as bis(p-carboxyphenyl)-methane, p-oxy p-carboxyphenyl) benzoic acid, ethylene-bis(p-oxybenzoic acid), 1,5,-naphthalene dicarboxylic acid, 2,6-naphthalene dicarboxylic acid, 2,7,-naphthalene dicarboxylic acid, phenanthrene dicarboxylic acid, anthracene dicarboxylic acid, 4,4'-sulfonyl dibenzoic acid, 3,4,-furan dicarboxylic acid, $C_1$-$C_{12}$ alkyl and ring substitution derivatives thereof, such as halo, alkoxy and aryl derivatives. Hydroxy acids such as p-(betahydroxyethoxy) benzoic acid can also be used provided an aromatic dicarboxylic acid is also present.

Aromatic dicarboxylic acids are a preferred class for preparing the copolyetherester polymers useful in this invention. Among these aromatic acids, those with 8 to 16 carbon atoms are preferred, particularly the phenylene dicarboxylic acids, i.e., phthalic, terephthalic, and isophthalic acids.

Low molecular weight diols which can be used are aliphatic, cycloaliphatic, and aromatic diols having a molecular weight of less than about 250 and two functional hydroxyl groups. Diol equivalents which form esters with dicarboxylic acids are included and the molecular weight requirement applies only to the diol and not to its equivalent. Such equivalents are illustrated by ethylene oxide and ethylene carbonate which can be used in the place of ethylene glycol. However, ethylene glycol cannot be used as the low molecular weight diol when all or part of the dicarboxylic acid is an aliphatic acid because of the relatively poor hydrolytic stability of copolyetheresters containing such short chain ester units.

The terms aliphatic, cycloaliphatic, and aromatic as used to define the diols useful for this invention have the same general meaning as applied to the dicarboxylic acids and glycols set forth herein with the location of the functional hydroxyl groups being the determining factor similar to the location of the carboxyl groups for the dicarboxylic acids.

Preferred low molecular weight diols useful in the process of this invention include diols having 2 to 15 carbon atoms, such as ethylene, 1,2- or 1,3,-propylene, isobutylene, tetramethylene, pentamethylene, 2,2-dimethyl-trimethylene, hexamethylene, and decamethylene glycols, dihydroxy cyclohexane, cyclohexane dimethanol, hydroquinone-bis(beta-hydroxyethyl)ether resorcinol, hydroquinone, 1,5-dihydroxy naphthalene, etc. Especially preferred are aliphatic diols containing 2 to 8 carbon atoms. Bis-phenols, such as bis(p-hydroxy) diphenol bis(p-hydroxyphenol)methane and bis(p-hydroxyphenyl)propane can be used.

Preferred copolyetheresters are prepared from terephthalic acid, optionally containing up to 30% of isophthalic or phthalic acid, butanediol-1,4 and polytetramethylene ether glycol.

The production of hollow objects from thermoplastics by blow molding is a known commercial method of manufacturing. See for example U.S. Pat. No. 3,745,150 to Corsover. The production of film from thermoplastics by extrusion and blowing is also a known commercial method of manufacturing. Both of these techniques have been previously disclosed as useful techniques for the processing of copolyesters; however, on a commercial scale such techniques have not been widely employed on these copolyesters because, it is believed, the copolyesters in the molten state have very little melt strength and when it is attempted to process the copolyesters by blow molding the extrudate (or parison), instead of hanging from the nozzle, often drops off.

The blends of the present invention provide compositions retaining most of the desirable properties of copolyetheresters when formed into molded objects or film but are softer than the unmodified copolyetheresters. The blends exhibit improved processing characteristics, such as improved demolding behavior. The blends also have increased melt strength. One method of gauging the melt strength of a polymer is to determine its melt tension. Melt tension is the force necessary to draw the extrudate of a predried polymer at a constant rate of 10 ft/min from an Instron capillary rheometer operated at a temperature approximately 30° C. above the melting point of the copolyetherester and using a die having an inside diameter of 0.04 inch, length-to-diameter ratio of 4 and 90° entrance angle with Instron cross head speed of 0.2 in min. (The polymer is predried for 1 hour at 100° C. in a vacuum oven before testing.) This force is referred to herein as melt tension. In order for a blend to be blow moldable and extrudable into blown film at commercially desirable rates, it should have a melt strength corresponding to a melt tension of at least 0.4 gm. The temperatures at which the melt tension measurements are made are indicated in the Examples and are related to suitable processing temperatures for the particular copolyetherester being used.

Fillers and pigments may be incorporated in the blend to increase the toughness and temperature resistance, e.g., very finely divided silica, alumina or calcium carbonate. Additives or processing aids may be used to further decrease the melt viscosity of the blends for more ease of application. Anti-oxidants and stabilizers also may be incorporated in the polymers to improve the thermal and oxidative stability at elevated temperatures.

The blending of the copolyetherester and the acrylonitrile/butadiene copolymer may be effected in various ways, including blending on hot rolls, or mixing in an internal mixer such as a Banbury. A preferred method it to dry blend the polymers in powder or granular form and extrude the dry blend with a screw-type extruder. Melt blending of the polymers in the absence of any processing aids such as solvents or plasticizers requires operations at temperatures near or above the softening point of the polymers, i.e., about 150°–250° C.

The following examples and preparations illustrate the invention. All parts, proportions, and percentages disclosed herein and throughout the specification are by weight, unless otherwise indicated.

PREPARATIONS

Copolyetherester P is prepared by ester interchange of 4.53 moles of dimethyl terephthalate (hereinafter DMT), 1.27 moles of dimethyl isophthalate (hereinafter DMI), 1.0 moles of polytetramethyleneether glycol (hereinafter PTMEG 980) (having a number average molecular weight about 980) and excess 1,4-butanediol in the presence of a tetrabutyl titanate/magnesium acetate catalyst and a stabilizer, 1,6-bis[3-(3,5-di-tert-butyl-4-hydroxyphenyl) propionamide]hexane. Ester interchange is conducted at atmospheric pressure up to a final temperature of 220° C. The ester interchange is followed by polycondensation at 250° C. at a pressure of about 133 Pa for about 90 minutes. The resulting polymer has an inherent viscosity of about 1.4 dl/g. It contains 51% by weight long chain ester units.

Copolyetherester Q is prepared by ester interchange of 7.6 moles of DMT, 1 mole PTMEG-980 and excess 1,4-butane-diol using the ester interchange and polycondensation conditions and catalyst and stabilizer described for the preparation of copolyetherester P. Copolyetherester Q has an inherent viscosity of about 1.4 dl/g. It contains 40% by weight long chain ester units.

Inherent viscosities of the copolyetheresters described hereinafter are measured at 30° C. at a concentration of 0.1 g/dl in m-cresol.

Polymer melting points are determined by differential scanning calorimetry. Prior to melting point determination, polymer samples are conditioned by heating to 30° C. above the apparent melting point and cooling to 25° C. at a rate of 10° C./min. The heating rate employed for actual melting point determination is 10° C./min.

The following ASTM methods are employed in determining the properties of the polymers prepared in the examples which follow:

| | |
|---|---|
| Modulus at 100% elongation, $M_{100}$ | D412 |
| Permanent set at 100% elongation, $PS_{100}$ | D412 |
| Modulus at 300% elongation, $M_{300}$ | D412 |
| Tensile at break, $T_B$ | D412 |
| Elongation at break, % | D412 |
| Hardness, Shore A | D676 |
| Hardness, Shore D | D1484 |

Metric units are employed throughout the Examples. Stress and pressure are given in MPa (megapascals) in accordance with the International System of Units. For convenience, 1000 psi = 6.895 MPa = 70.3 kg/cm².

EXAMPLE 1

The following polymers and other ingredients were tumble-blended in the following proportions (in parts by weight) followed by extrusion blow-molding.

| | Composition A | Composition B |
|---|---|---|
| 50:50 blend of polyvinyl chloride resin and acrylonitrile/butadiene rubber; acrylonitrile content 34% ML 4, 100° C of about 47 | 20 | 40 |
| Copolyetherester P | 100 | 100 |
| Cadmium soap heat stabilizer for PVC | 2 | 2 |
| Alkylated triaryl phosphite heat stabilizer for PVC | 1 | 1 |

Both compositions A and B were found to run well and provide bottles of uniform thickness and hardness on blow-molding.

EXAMPLE 2

The following polymer was blended together in the following proportions by weight:

| | C |
|---|---|
| Copolyetherester Q | 70 |
| Acrylonitrile/butadiene copolymer, acrylonitrile content 28%, ML-4, 100° C of about 85 | 30 |

The blend displayed the following properties:

| | C |
|---|---|
| Initial Tensile Properties* | |
| Tensile strength MPa | 14.2 |
| Elongation at Break, % | 410 |
| Yield Strength MPa | 9.07 |
| Hardness Shore D | 44 |
| After Aging 7 Days at RT in ref. fuel "B"** | |
| Tensile Strength MPa | 10.9 |
| Elongation at Break, % | 290 |
| Yield Strength MPa | 4.68 |
| Hardness Shore D | 30 |
| Volume Increase, % | 26.3 |
| Tensile Strength (% ret) | 77 |
| Elongation at Break (% ret) | 71 |
| Yield Strength (% ret) | 52 |
| Hardness Shore D pts. change | −14 |
| After Aging 7 Days at RT in ref. fuel "C"*** | |
| Tensile Strength, MPa | 8.62 |
| Elongation at Break, % | 240 |
| Yield Strength, MPa | 4.51 |
| Volume Increase, % | 55.7 |
| Hardness Shore D | 20 |
| Tensile Strength (% ret) | 61 |
| Elongation at Break (% ret) | 59 |
| Yield Strength (% ret) | 50 |
| Hardness Shore D pts. change | −24 |
| Stress Retention with Temperature | |
| Yield Strength MPa at 100° C | 4.50 |
| Yield Strength MPa at 120° C | 3.81 |
| Yield Strength MPa at 150° C | 2.19 |

*All results on dumb-bells cut from injection molded slabs in machine direction.
**Ref. fuel "B" - 70% isooctane, 30% toluene.
***Ref. fuel "C" - 50% isooctane, 50% toluene.

EXAMPLE 3

A series of blends are prepared from copolyetherester Q and butadiene/acrylonitrile copolymer having an acrylonitrile content of about 40% by weight, a specific gravity of 1.00 and an ML-4, 100° C., of about 115. Melt blending of the polymers is performed in a Brabender Plastograph fitted with Sigma blades operated at 75 rpm and a temperature of 215° C. Composition of the blends and their melt tensions are listed below:

| % By Weight, Nitrile Rubber | Melt Tension, g at 225° C |
|---|---|
| 0 | 0.2 |
| 5 | 0.35 |
| 10 | 0.55 |
| 20 | 2.6 |
| 30 | 4.5 |

All of the blends perform better than the starting copolyetherester in blow molding, particularly the blends containing 20 or 30% weight nitrile rubber.

EXAMPLE 4

Two blends are prepared from Copolyetherester Q and a butadiene/acrylonitrile copolymer having an acrylonitrile content of about 32% by weight, a specific gravity of 0.98 and ML-4, 100° C., of about 80. The blends are prepared by milling the polymers on a heated rubber mill for 10 minutes at 215° C. Samples for physical testing were prepared by compression molding at 225° C.

The stress-strain properties of the blends are tabulated below:

| Nitrile Rubber % by Weight | 0 | 33 | 50 |
|---|---|---|---|
| $M_{100}$, MPa | 14.9 | 11.5 | 8.7 |
| $T_B$, MPa | 41.6 | 17.7 | 11.0 |
| $E_B$, % | 520 | 350 | 200 |
| Hardness | | | |
| Shore A | 96 | 91 | 87 |
| Shore D | 57 | 42 | 35 |

The blends are suitable for blow-molding. The blend containing 33% nitrile rubber has exceptionally good processing behavior in injection molding applications.

EXAMPLE 5

A series of blends are prepared from Copolyetherester P and the butadiene/acrylonitrile rubber used in Example 3. Blending is accomplished in a Brabender Plastograph operating at 75 rpm and 180° C. for 10 minutes. Compositions of the blends, their melt tensions and physical properties are tabulated below:

| Nitrile Rubber % by Weight | 0 | 10 | 20 | 25 | 33 |
|---|---|---|---|---|---|
| Melt Tension at 180° C | 0.35 | 2.2 | 6.5 | 5.8 | — |
| Hardness Shore D | 42 | 41 | 39 | 38 | 35 |
| $M_{100}$ MPa | 6.8 | 6.2 | 5.6 | — | 4.5 |
| $M_{300}$ MPa | 9.0 | 8.6 | 7.6 | — | — |
| $T_B$, MPa | 31.0 | 24.1 | 20.7 | — | 10.7 |
| $E_B$, % | 820 | 780 | 790 | — | 690 |

All of these blends can be readily used in commercial blow molding operations whereas the unblended Copolyetherester P can only be blow molded if extraordinary control of molding variables is maintained.

Similar results are obtained when a second series of blends is formed in which another butadiene/acrylonitrile copolymer is used. This second nitrile rubber has an acrylonitrile content of about 30%, a specific gravity of 0.98 and ML-4, 100° C. of about 70.

EXAMPLE 6

A series of blends of Copolyetherester Q and the butadiene/acrylonitrile copolymer used in Example 3 were prepared in the Brabender Plastograph. The copolyetherester contained 1% by weight of 4,4'-bis($\alpha,\alpha$-dimethylbenzyl)diphenylamine as stabilizer rather than the hexane derivative. The blends and the straight copolyetherester were compression molded at 225° C. to from 1.27 mm slabs from which dumbbells were cut. The dumbbells were tube aged in air at 179° C. Composition of the blends and test results are listed below:

| % Nitrile Rubber | Days to Failure at 179° C |
|---|---|
| 0 | 1 |
| 2 | 5 |
| 5 | 7 |
| 10 | 6 |

Failure was indicated when the test specimens had degraded to such a degree that they broke on being bent double on themselves. It is evident from the data that a minor amount of the butadiene/acrylonitrile copolymer provides substantial protection for the copolyetherester.

I claim:

1. An elastomeric blend of (A) a butadiene/acrylonitrile copolymer and (B) a copolyetherester consisting essentially of 15-95% by weight of short chain ester units derived from a dicarboxylic acid and having a molecular weight not greater than 300 and a diol having a molecular weight not greater than 250, and 5-85% by weight of long chain ester units derived from a dicarboxylic acid having a molecular weight not greater than 300 and a poly(alkylene oxide)glycol having a number average molecular weight of 400-6000, said copolyetherester having a melting point of at least 100° C.; the blend containing from 1-50% by weight of component (A).

2. An elastomeric blend of claim 1 wherein said blend has a melt tension of at least about 0.4 gm.

3. An elastomeric blend of claim 2 wherein the acrylonitrile/butadiene copolymer has a Mooney viscosity of from about 30-120 [ML-4, 100° C.].

4. An elastomeric blend of claim 2 wherein copolyetherester (B) has a molecular weight such that the inherent viscosity measured in m-cresol at 30° C. at 0.1 gm/dl is between about 0.75-1.7.

5. An elastomeric blend of claim 2 containing up to about 20% by weight polyvinyl chloride.

6. A blow-moldable elastomeric blend of claim 2 wherein the copolyetherester is derived from phthalic, isophthalic, terephthalic acid or mixtures thereof, 1,4-butanediol and poly(tetramethylene oxide)glycol.

7. A blow-moldable elastomeric blend of claim 2 wherein the acrylonitrile/butadiene copolymer is present in the blend in an amount of from about 15-35% by weight.

8. A blow-moldable elastomeric blend of claim 2 wherein copolyetherester component (B) has from about 15-75 weight percent long chain ester units.

* * * * *